Sept. 11, 1962  B. B. RAPPAPORT  3,053,169
HEAT DISSEMINATING MULTIPLE SPIT ASSEMBLY AND STAND
Filed Oct. 9, 1959  2 Sheets-Sheet 1

INVENTOR
BERNARD B. RAPPAPORT
ATTY.

Sept. 11, 1962 B. B. RAPPAPORT 3,053,169
HEAT DISSEMINATING MULTIPLE SPIT ASSEMBLY AND STAND
Filed Oct. 9, 1959 2 Sheets-Sheet 2
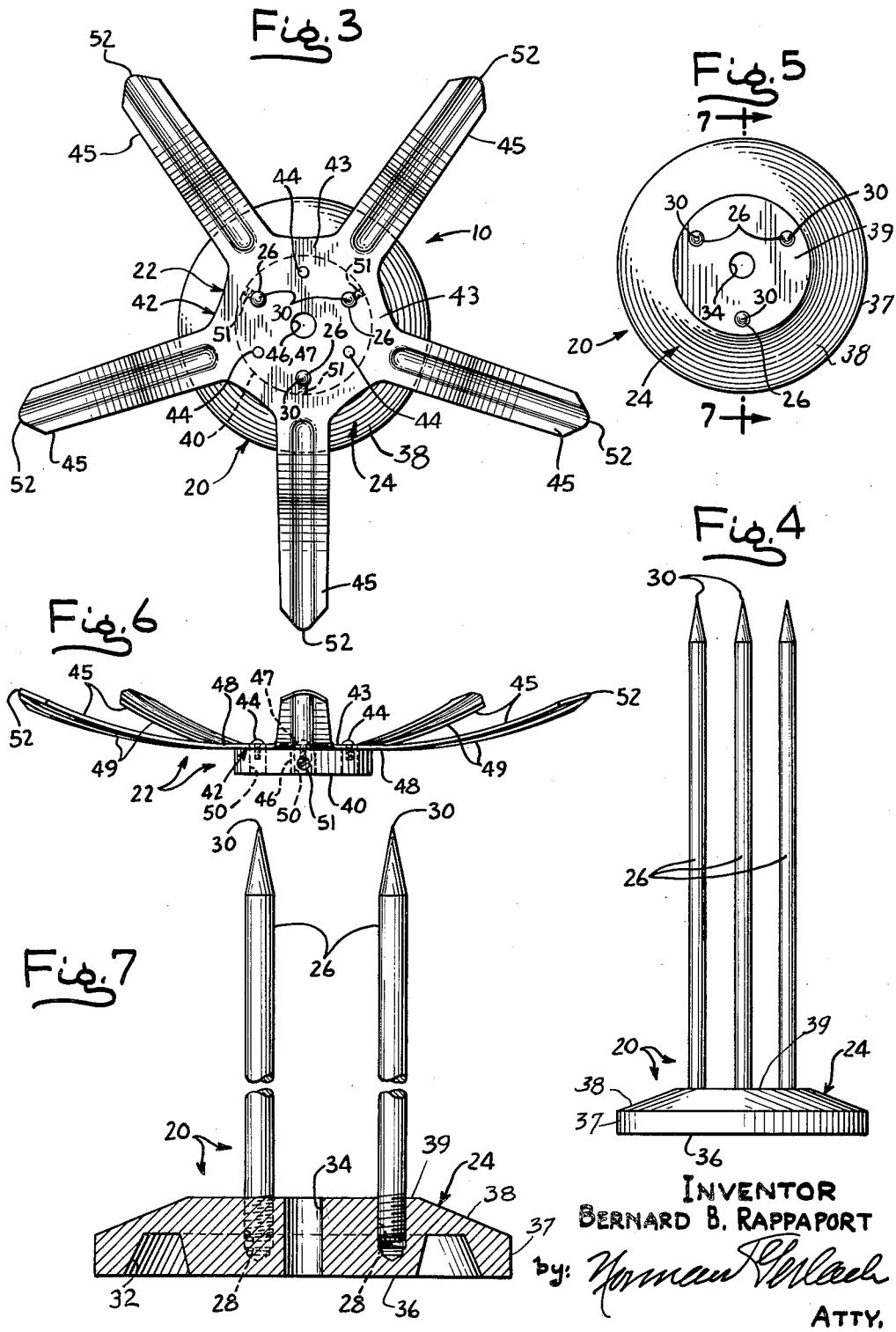
INVENTOR
BERNARD B. RAPPAPORT
ATTY.

United States Patent Office 3,053,169
Patented Sept. 11, 1962

3,053,169
HEAT DISSEMINATING MULTIPLE SPIT
ASSEMBLY AND STAND
Bernard B. Rappaport, 17859 Howe Ave., Homewood, Ill.
Filed Oct. 9, 1959, Ser. No. 845,568
2 Claims. (Cl. 99—421)

The present invention relates to cooking aids for effecting a more even distribution of oven or other ambient heat throughout the mass of one or several food items undergoing preparation.

It has long been recognized that in the cooking of foodstuffs, particularly large bulk foodstuffs such as roasts, Idaho or other large baking potatoes and the like, there is a tendency to overcook the outer portions of the food product in order that sufficient heat may be applied to the interior of the same for the necessary length of time to effect proper cooking thereof. To obviate this limitation which is attendant upon the cooking of bulk foodstuffs, various means have been provided for channeling heat through the food product, such means taking the forms of spikes or skewers of high heat conductivity, usually aluminum. Such spikes or skewers have a heat conductivity considerably greater than that of the roast or other food product itself and, because they are pointed at one end, they may be thrust through the product undergoing cooking so that the heat channels afforded thereby are, in effect, expanded radially outwardly against the surrounding meat or other foodstuff and an extremely effective intimate contact is effected between the food product and the member or members on which it is thus impaled.

The present invention is specifically concerned with a multiple spit assembly of novel design embodying stab-type heat channels of the character outlined above, the assembly being specifically designed to accommodate the simultaneous distribution of heat through a roast, as well as a commensurate number of Idaho or other baking potatoes, the assembly being such that the entire quantity of food undergoing preparation may be handled conveniently as a unit during introduction thereof into and removal thereof from an oven. The assembly is further constructed so that it will effect the desired temperature gradient throughout the various food items applied thereto in a manner which is more effective than has heretofore been possible, utilizing conventional separate or independent stab-type skewers.

Heretofore, in the oven-preparation of a meal including both a roast and potatoes, where heat channeling means are provided for both products, it has been customary to insert one or more individual large size heat-conducting skewers into the roast, after which the thus treated roast is inserted into the oven and given a pre-determined period of cooking treatment short of the actual time necessary to complete the cooking thereof. Thereafter, at a time estimated for complete start to finish cooking of the potatoes, the latter are introduced into the oven with individual small size skewers, usually in the form of aluminum nails, therein and are cooked to completion along with the partially cooked roast. Such a procedure is possessed of numerous limitations, principal among which is the necessity of accurate timing of food introduction into the oven and close temperature control, based largely upon cooking time estimates ascertained from the relative size and weight of the various food items involved. Additionally, separate cooking utensils or receptacles are required for the roast and the potatoes except in cases where the latter are distributed upon the wire rack or racks ordinarily associated with household ovens. In the latter instance, the placement of the individual potato in and about the rack leads to unsightly and inedible contact-charring of the potatoes along lines of tangency with the rack wires.

Yet another limitation that is attendant upon the preparation of foodstuffs in this manner, utilizing heat-distributing skewers for heat-channeling purposes, is that, in the case of the roast, the latter is obliged to rest upon the bottom of the cooking receptacle where a constant rise in the rendered liquid constituents resulting from the cooking operation results in grease saturation of the lower portion of the roast, heat charring thereof and consequent sticking of the roast to the bottom of the receptacle where heat accumulation is relatively great. If the moisture content is low, the lower region of the roast is, in effect fried to a crust whereas if considerable water is present, the lower region of the roast is stewed and much natural flavor is lost.

In the case of potatoes, the dry heat of the oven frequently leads to brittle skin crusts. Furthermore, if the aluminum nails are small, heat penetration into the individual potatoes is slight. If the nails are of adequate size to effect proper heat penetration, there is danger of rupture of the individual potatoes during penetration thereof.

The present invention is designed to overcome the above-noted limitations that are attendant upon the construction and use of present-day cooking aids of the heat-conducting skewer type and, toward this end it contemplates the provision of a novel multiple spit assembly designed specifically for use in connection with the simultaneous cooking of a roast and a vegetable such as of potatoes in the requisite number for any given meal, stab type skewers or penetrating prongs being provided for both the roast and potatoes, and the assembly being so designed as to produce heat-conducting channels through or in both products in such a manner as to retard normal heat transfer as far as the potatoes are concerned and to enhance heat transfer as far as the roast is concerned, thus equalizing, insofar as practicable, the cooking time for both products and to a large extent eliminating the necessity for guesswork in estimating the cooking time for each product. In carrying out this object, the invention contemplates the provision of an assembly wherein the skewers or spits for the roast are relatively massive and are fixed to a base member which presents a relatively large exposed surface area so that a large amount of heat may be collected by the base member and channeled into the roast, thereby appreciably reducing the necessary cooking time for the latter. The stab type skewers for the potatoes are formed as an integral unit of cradle-like design with the various skewers being in the form of flat radially extending arms which, collectively, form a shallow open pocket within which the lower region of the roast may seat with each arm bearing against the underneath side of the roast throughout a major portion of its radial extent. The tip of each arm is designed to receive thereon a potato and, for this purpose, each arm is formed with a feathered or thin sharp potato-penetrating edge. This cradle-like structure is vertically adjustable on the meat skewers or spits in such a manner that it is in intimate heat-exchange contact therewith. The various components of the entire assembly are so designed that it is possible to select a roast and a group of accompanying potatoes which are of such size and shape that when the roast is in position on the roast-receiving skewers, the cradle-like pocket afforded by the potato-receiving skewers is substantially filled, with only the tops of these latter skewers being exposed. When the potatoes are inserted over the exposed tips of the cradle arms, they are closely nested about the roast and they may be forced against the outer side of the roast so that a relatively large surface area of each potato is in intimate contact with an area of the roast. With the roast and potatoes thus arranged on the assembly, the relatively large amount of heat which is channeled into the roast and which also is directed into the roast by direct contact with the flat cradle arms very appreciably reduces the cooking time for the roast. On the other hand, since the potatoes, which ordinarily will be fairly large in size, are held in position against the roast only by the extreme tips of the cradle arms, much of the heat collected by these arms by conduction from the roast-receiving skewers is transmitted into the roast with little heat remaining for channeling into the potatoes. In other words, a large percentage of the heat collected by the metal parts of the assembly is directed into the roast while the tips of the cradle arms are employed principally as supports, thereby allowing the potatoes to cook in their normal manner while at the same time they are kept moist by their intimate association with the roast. Furthermore, since an appreciably large area of each potato is in intimate contact with the roast, it is heat-shielded by such contact and cooking time is thus further reduced. It has been found that, according to the present invention, a roast which ordinarily will require two hours' cooking time at a given temperature for completion will assimilate sufficient heat to complete its cooking in approximately one hour. With the selection of potatoes which are firm and of large size, such potatoes will also be cooked to completion within an hour and thus both the roast and potatoes may be placed in the oven and removed therefrom simultaneously.

Although the present spit assembly has been designed for selection of a roast and accompanying potatoes for simultaneous cooking thereof over a given period of cooking time as outlined above, the assembly is capable of other uses and, if desired, food selection may be made and arranged on the various skewers provided therefor in such a manner that the cooking time for either the roast or the potatoes may be varied. For example, utilizing a smaller roast and large potatoes, the potato-impelling arms may be more firmly embedded in the potatoes, thus affording definite heat channels into the latter product. By adjustment of the food products on their respective skewers in various ways, and by adjustment of the skewers relative to one another, variations in cooking time and in the relative degrees of cooking of the products may be effected.

The provision of a multiple spit assembly of the character briefly outlined above being among the principal objects of the invention, it is a further object to provide such a spit assembly wherein the spits or skewers for the roast and the potatoes respectively are separable, so that the roast spits may be employed separately for cooking a roast alone while, similarly, the potato spits or skewers may be employed for baking the potatoes independently.

Another object of the invention is to provide a multiple spit assembly capable of use as a cooking aid in the preparation of the main course and principal vegetable, i.e. a roast and accompanying potatoes, and by means of which both the roast and potatoes are maintained in an elevated position above the level of the oven support therefor so that neither the roast nor the potatoes are subject to either the aforementioned stewing or frying action of any drippings or rendered grease which may issue from the roast. In the attainment of this object, the relatively massive skewers or spits which are designed for the roast, as stated above, are fixedly secured in a base member having a large exposed surface area albeit a relatively small base support so that a large amount of heat may be collected by the base member and channeled into the roast. Additionally, by virtue of the relatively small overall dimensions of the base support, it is not necessary to select a large cooking receptacle for the roast and potato combination, it being merely necessary to provide a cup-shaped receptacle sufficient in capacity to collect all of the drippings from the roast during cooking thereof. Still further, by thus isolating the drippings and other rendered grease issuing from the roast and collecting the same in a pool below the roast, basting procedure is materially simplified and both the roast and the potatoes which are supported on the multiple spit assembly may conveniently be basted from time to time with the excess basting liquid returning to the pool by gravity.

A still further advantage of the present invention resides in the fact that because the various cradle arms afforded by the radially extending potato skewers serve to cradle or pocket the lower regions of the roast in basket-like fashion, the roast is held together and any tendency for the roast to fall apart under gravitational influences is precluded.

Numerous other objects and advantages of the invention, not at this time enumerated, will become more readily apparent as the following description ensues.

In the accompanying two sheets of drawings forming a part of this specification, one illustrative embodiment of the invention has been shown with the multiple spit assembly being shown in one typical environment within an oven.

In these drawings:

FIG. 3 is a top plan view of the spit assembly with the articles of foodstuff removed;

FIG. 4 is a side elevational view of a roast-supporting assembly employed in connection with the present invention;

FIG. 5 is a top plan view of the structure shown in FIG. 4;

FIG. 6 is a sectional view taken substantially along the line 6—6 of FIG. 5; and FIG. 7 is a side elevational view of a potato-supporting assembly employed in connection with the invention.

Figure 1:
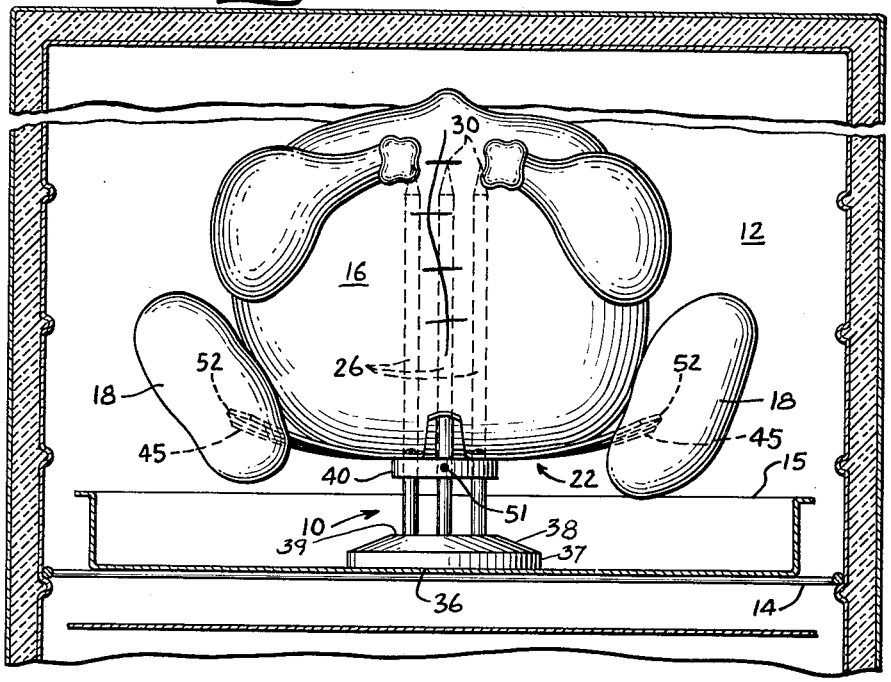
FIG. 1 is a vertical sectional view taken transversely through a cooking oven and showing the improved multiple spit assembly operatively disposed therein.

Referring now to the drawings in detail and in particular to FIG. 1, the improved multiple spit assembly of the present invention has been designated in its entirety at 10. The assembly is designed to receive thereon articles of food to be cooked in an oven such as the oven which has been designated in its entirety at 12. The oven 12 may be of conventional construction and no particular form of oven is intended since it constitutes no part of the present invention. The oven may be heated either by combustion of a gas or it may be heated electrically, the only portion of the oven pertinent to the present invention being an oven rack such as the rack 14 which extends across the lower regions of the oven and is adapted to support thereon a suitable container or drip pan 15 on the bottom of which the spit assembly 10 is adapted to rest during cooking of food products on the assembly.

While various articles of food to be cooked may be applied to the spit assembly, the assembly is specifically designed for use in connection with the cooking of a suitable roast which may be a fowl or a piece of meat, together with an appropriate number of potatoes which are to be baked at the same time that the roast is to be cooked. Accordingly a suitable roast 16 and a number of potatoes 18 are shown as being operatively mounted on the assembly 10.

The spit assembly is of two-piece construction and it involves in its general organization a combined stand and spit unit 20 for the roast and a spider-like multiple spit unit 22 for the potatoes.

The spit unit 20 for the roast includes a relatively massive circular base 24 which is formed of a material such as aluminum which has a high degree of heat conductivity, together with a plurality of spits proper or skewers 26 which project upwardly from the central region of the base 24, these skewers likewise being formed of aluminum. Each skewer 26 is in the form of a relatively thick cylindrical rod, the lower end of which is threaded into a tapped cylindrical bore 28. While any number of such meat skewers or rods 26 may be employed, it has been found that three such rods will accommodate the average roast. It will be understood, of course, that the various rods 26 are of a sufficient length to accommodate the height of the roast, and their spacing is such that when the roast is penetrated thereby these rods will be equally spaced about the vertical center line of the roast and well within the outer confines thereof. Preferably these rods are arranged along vertical axes which are equidistantly spaced so that in plan as shown in FIG. 5, the rods are disposed at the apices of an equilateral triangle. The upper end of the rods are pointed as shown at 30 so that the rods or spits proper 26 are of the stab type. Each rod 26 defines an elongated heat channel along which heat may flow into the roast and be dissipated radially outwardly therein in all directions.

The efficiency of the rods 26 as heat collectors is materially enhanced by the provision of the base 24 which, although not large, presents a relatively large surface area for the collection of heat. The underneath side of the base 24 is provided with a relatively wide and deep annular groove 32, the side walls and bottom of which materially add to the total or overall heat-collecting surface area of the base. The cylindrical wall of a vertical hole or bore 34 provided centrally through the base 24 still further adds to the heat-exposed surface area. The base 24 is formed with a flat bottom 36 by means of which it possesses a degree of stable equilibrium when supported on the bottom of the drip pan or other receptacle. The base 24 has a cylindrical side face 37 of relatively short height, and a frusto-conical surface 38 connects the side face 37 with a flat circular upper face 39.

The potato spit assembly 22 is preferably of two-piece construction and it includes a central hub or base part 40 (FIGS. 2 and 6) and a spider-like part 42 which may be formed of heavy gauge sheet aluminum or which may be in the form of a relatively thin casting. The part 42 includes a central hub portion 43 which is secured to the base part 40 by screws 44 and from which there extends radially outwardly a series of potato-supporting arms or spits proper 45. The hub 40 bears the same relation to the various arms 45 that the base 24 bears to the roast skewers 26 insofar as heat conductivity is concerned. This base 24 presents a relatively expansive heat-collecting surface area so that the potato-supporting arms will have a relatively large heat reservoir from which it may draw heat for heat exchange purposes between these arms and the roast and between the arms and the potatoes which are adapted to be impaled on the outer ends thereof, all in a manner that will be made clear presently. To increase this surface area, a hole 46 extends vertically or axially through the base 40 and is in register with a similar hole 47 formed centrally in the hub portion 41 of the spider-like part 42.

Figure 2:
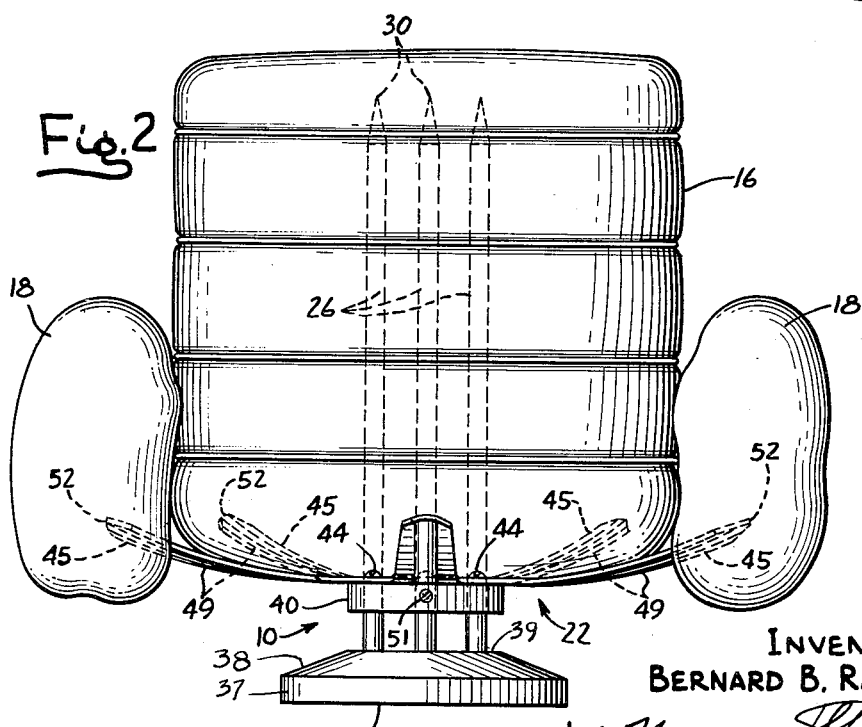
FIG. 2 is a side elevational view of the spit assembly showing the same in actual use.

The arms 45 are generally flat, which is to say that the individual arms are of appreciable width but have little thickness. The arms 45 extend radially outwardly in a horizontal plane in the immediate vicinity of the hub portion 43 as indicated at 48 and the outer regions of the arms are curved gradually upwardly as at 49 so that all of the arms, considered as a whole, constitute in effect an open cradle structure adapted to receive therein the lower regions of a roast which may be impaled upon the spits 26. The base 40 is formed with a series of vertical bores 50 therethrough through which the three skewers 26 are adapted to project with a tight sliding fit. The entire potato spit assembly may be supported as shown in FIG. 2 at any desired elevation along the spits 26 to accommodate roasts of different height. A series of anchoring or set screws 51 extend into the base radially and each is designed for engagement with one of the skewers 26 so that the potato spit assembly may be held in any desired position of vertical adjustment.

The extreme outer end of each of the potato-impaling arms 45 is pointed as shown at 52 to facilitate stab penetration of the potatoes which are to be impaled on these arms.

The multiple spit assembly described above is capable of being used in several ways, depending largely upon the judgment of the users who, at different times, will be confronted with different situations with respect to the size and character of the available food products to be cooked and who will have in view different cooking requirements. The most effective use of the multiple spit assembly will, as a rule, be attained by users who have sufficient experience in the art of cookery to enable them to apply their cooking experience appropriately to the use of the present cooking implement. While a few appropriate uses of the assembly will be set forth herein, it will be understood that the cooking implement will find many other practical uses.

Where a roast alone is to be cooked, the potato spit assembly 22 may be removed from the combined stand and spit assembly 20 and the three meat skewers may be forced through the meaty regions of the roast so that they will extend substantially centrally through the same. If the roast is a firm one, frictional forces will retain the same at any desired elevation along the rods 26. The stand 20 may then be placed on the bottom of a suitable drip pan such as the pan 15, with the roast thus centered thereon for placement in the oven. Where the roast is not a firm one, it may be found expedient to apply the potato spit assembly to the rods 26 as previously described and allow the bottom region of the roast to rest in the cradle afforded by this potato spit assembly without applying potatoes to the arms 45. In such an instance the heat assimilated by the arms 45 will, by virtue of their intimate contact with the bottom region of the roast apply heat to the roast, thus augmenting the heat-channeling action of the rods 26. Cooking time may thus be shortened to a slight extent over a situation where the assembly 22 is not employed. Similarly, the assembly 22 may be employed for the baking of potatoes when such potatoes are not to be accompanied by a roast. In such an instance the potatoes may be forced on to the ends of the arms 45 to any desired extent. If the arms 45 are caused to completely penetrate and project through the potatoes, obviously a relatively short cooking time will be required. The fact that the arms 45 are flat as described above will insure a relatively large and widely distributed area of intimate contact between the arms 45 and the potatoes so that such arms are somewhat more effective than ordinary conventional aluminum potato nails. The amount of heat distributed to the potatoes is materially enhanced by the large surface area of the base 24 which collects heat and channels the same along the rods 26 and into the hub 40, from whence it is channeled along the arms 45 and into the potatoes. The stand 20 serves conveniently to support the potato spit assembly 22 and maintains the potatoes appropriately positioned within the oven. It is within the contemplated used of the potato spit 22 to employ the same singly without using the stand 20, in which case the base 40 may be supported on the oven rack.

Where both a roast and a number of potatoes are to be baked, the potato rack and spit assembly 22 may be lowered on the rods 26 and the roast applied to the rods above this rack. The potatoes will, of course, be applied to the outer ends of the arms 45. If the roast is pushed downwardly on the rods 26 so that its bottom region makes firm contact with the cradle portion of the potato rack and spit assembly 22, the potatoes may be impaled on the arms 45 to such an extent that the inside faces thereof make intimate contact with the sides of the roast. If a large roast is selected and the potatoes are fairly massive the roast may be so arranged that when the potatoes are impaled on the arms 45 and forced against the roast as previously described they will be only slightly penetrated by the tips of the arms and the assembly 22 will then serve largely as a support for the potatoes rather than as a cooking aid. In a situation of this sort most of the heat collected by the assembly 10 will be channeled into the meat by the rods 26 and conducted into the lower regions of the meat from the outside thereof by the arms 45 so that the potatoes will become cooked in their normal manner with both the roast and the potatoes becoming fully cooked at the same time so that it is not necessary to estimate a later time for potato introduction into the oven than the initial time of roast introduction. If however it is desired to cook the roast for a period of time and later introduce the potatoes into the oven, the roast may be maintained elevated on the rods 26 for a predetermined period of cooking time, after which the potatoes may be fully impaled on the arms 45 so that the arms project completely through the potatoes.

While the invention has been described herein specifically in connection with the cooking of a roast and an accompanying group of potatoes, it will be understood that other food products may be applied to the assembly 10. For example the rods 26 may be employed to receive thereon individual small pieces of meat or they may receive thereon pieces of meat interspersed with chunks of vegetable for the quick roasting or barbecuing of these articles. The same is true of the arms 45 and thus for this character of cooking the capacity of the assembly 10 is relatively great. In this connection extremely small bits of food products may be impaled on a single arm 26 or arm 45 in shish kebab fashion while, for larger food chunks, two or three of the arms 26 may be caused to pass through these chunks of meat or other food product.

The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

Having thus described the invention what I claim as new and desire to secure by Letters Patent is:

1. A two-part separable multiple spit assembly and stand adapted for use in supporting and aiding in the simultaneous cooking of a roast and an accompanying group of whole potatoes, the constituent parts of said assembly being formed of a metal having high heat conductivity, said assembly including a roast-supporting spit part and a potato-supporting spit part, said roast-supporting spit part comprising a base support, and a rod in direct contact with and projecting upwardly from said base support in heat-exchange relation thereto and embodying a point at the upper end thereof, said rod being adapted for insertion into the roast for positioning the same above the base support, said potato-supporting spit assembly comprising a hub mounted on said rod in heat-exchange relation and being vertically slidable thereon, and a plurality of radially extending outwardly diverging arms on said hub, said arms being curved to accommodate the curvature of the underneath side of a roast impaled upon said rod above said hub and, in combination with the hub, constituting in effect a shallow dished cradle-like support for the roast, each arm embodying an outwardly and slightly upwardly directed point at its distal end, each arm being adapted for impalement thereon of a whole potato in nested position against the roast, and means for securing said hub in any selected position of vertical adjustment.

2. A two-part multiple spit assembly and stand adapted for use in supporting and aiding in the simultaneous cooking of a roast and an accompanying group of whole potatoes, the constituent parts of said assembly being formed of a metal having high heat conductivity, said assembly including a roast-supporting spit part and a potato-supporting spit part, said roast-supporting spit part comprising a relatively massive solid base support adapted to be positioned on a horizontal supporting surface within an oven, and a plurality of spaced parallel rods having pointed upper ends and having their lower ends in contact with and extending upwardly from the upper regions of said base support in heat exchange relation thereto, said rods being adapted for insertion into the roast for supporting the same above the level of said base support, said potato-supporting spit part comprising a generally-cylindrical hub slidable vertically on said rods and through which the rods extend, and a generally dished star-shaped member adapted to have the impaled roast seated therein, said member being formed from flat metal stock having a flat central region secured to the upper face of said hub and presenting a series of radially outwardly diverging arms which overhang the periphery of said upper face and each of which embodies a point at its distal end, said arms being adapted for the impalement thereon of a potato, the portion of each arm which overhangs the periphery of said upper face being curved on a relatively large radius with the pointed ends of the arms being directed outwardly and upwardly.

References Cited in the file of this patent

UNITED STATES PATENTS

| 1,337,122 | Doak | Apr. 13, 1920 |
| 2,482,601 | Spartalis | Sept. 20, 1949 |
| 2,584,295 | Sanzenbacher | Feb. 5, 1952 |

FOREIGN PATENTS

| 401,374 | Great Britain | Nov. 16, 1933 |